(12) United States Patent
Jenkinson et al.

(10) Patent No.: US 9,654,294 B2
(45) Date of Patent: May 16, 2017

(54) NON-REPUDIABLE ATOMIC COMMIT

(71) Applicant: Red Hat, Inc., Raleigh, NC (US)

(72) Inventors: Thomas John Jenkinson, Leeds (GB); Paul Fletcher Robinson, Whitley Bay (GB)

(73) Assignee: Red Hat, Inc., Raleigh, NC (US)

( * ) Notice: Subject to any disclaimer, the term of this patent is extended or adjusted under 35 U.S.C. 154(b) by 66 days.

(21) Appl. No.: 14/632,773

(22) Filed: Feb. 26, 2015

(65) Prior Publication Data
US 2016/0254915 A1    Sep. 1, 2016

(51) Int. Cl.
*H04L 9/32*    (2006.01)

(52) U.S. Cl.
CPC .......... *H04L 9/3247* (2013.01); *H04L 9/3213* (2013.01)

(58) Field of Classification Search
None
See application file for complete search history.

(56) References Cited

U.S. PATENT DOCUMENTS

| | | | |
|---|---|---|---|
| 7,500,096 B2 | 3/2009 | Lang et al. | |
| 8,171,293 B2 | 5/2012 | Sudhakar | |
| 8,528,097 B2 | 9/2013 | Ginter et al. | |
| 9,331,990 B2* | 5/2016 | Le Saint | H04L 63/062 |
| 2004/0073790 A1 | 4/2004 | Ateniese et al. | |
| 2006/0143462 A1* | 6/2006 | Jacobs | G06F 21/64 |
| | | | 713/181 |
| 2009/0290715 A1* | 11/2009 | Mityagin | G06F 21/335 |
| | | | 380/278 |
| 2012/0179784 A1 | 7/2012 | Picconi et al. | |
| 2013/0226813 A1* | 8/2013 | Voltz | G06Q 20/38215 |
| | | | 705/67 |
| 2013/0275308 A1* | 10/2013 | Paraskeva | G06Q 20/32 |
| | | | 705/71 |
| 2013/0290719 A1* | 10/2013 | Kaler | H04L 63/0435 |
| | | | 713/168 |
| 2014/0351139 A1 | 11/2014 | Mizrah | |
| 2014/0351147 A1* | 11/2014 | Castrechini | G06Q 30/06 |
| | | | 705/79 |

FOREIGN PATENT DOCUMENTS

| | | |
|---|---|---|
| WO | WO 01/25883 A2 | 4/2001 |
| WO | WO 01/30016 A2 | 4/2001 |

OTHER PUBLICATIONS

Robinson, et al., "Implementing Fair Non-Repudiable Interactions with Web Services," Ninth IEEE International EDOC Enterprise Computing Conference, Sep. 2005.

(Continued)

*Primary Examiner* — Christopher Revak
(74) *Attorney, Agent, or Firm* — K&L Gates LLP

(57) ABSTRACT

Various examples are directed to systems and methods for coordinating a non-repudiable atomic commit transaction. A client may direct a transaction request to a transaction manager, where the transaction request comprises a transaction origin token. The transaction manager may create a transaction submission token and provide it to the client. The transaction manager may create a digest of a first work item to be executed by a first resource manager and send the digest to the first resource manager. The first resource manager may send the transaction manager a work item receipt token. The transaction manager may send the resource manager the transaction origin token.

20 Claims, 5 Drawing Sheets

(56) References Cited

OTHER PUBLICATIONS

Cook, et al., "Distributed Object Middleware to Support Dependable Information Sharing between Organisations," 2001.
Cook, et al., "Middleware Support for Non-repudiable Transactional Information Sharing between Enterprises," 2003.
Cook, "Middleware Support for Non-repudiable Business-to-Business Interactions," 2007.
Cook, et al., "Distributed object middleware to support dependable information sharing between organisations," International Conference on Dependable Systems and Networks, 2002.
Santiago, et al., "Study for Automatically Analysing Non-repudiation," LORIA—INRIA-UN2 (UMR 7503) BP 239, 54506 Vandœuvre-les-Nancy Cedex, France, accessed from http://www.avispa-project.org/papers/SantiagoV-CRiSIS05.pdf, on or before Jan. 27, 2015.
Klay, et al., "Automatic Methods for Analyzing Non-Repudiation Protocols with an Active Intruder," France Telecom R&D, Lannion, France; LORIA—Nancy Universite, Vandoeuvre-les-Nancy, France, accessed from http://www.avantssar.eu/odf/publications/paperKV-FAST08.pdf, on or before Jan. 27, 2015.
"Non-Repudiation," accessed from http://www.cse.scu.edu/~tschwarz/coen351_05/PPtPre/Nonrepudiation.ppt on or before Jan. 27, 2015.
Su Rui-dan, et al., "Achieving Fair Non-Repudiation for Web Services Transaction," Jan. 2010, accessed from http://www.researchgate.net/publication/251936997_Achieving_fair_non-repudiation_for_web_services_transaction, on or before Jan. 27, 2015.

\* cited by examiner ns. The request may be directed to a transaction manager 2. The transaction manager 2 may coordinate the distributed transaction while also acting as a trusted third

NON-REPUDIABLE ATOMIC COMMIT

BACKGROUND

A distributed transaction is a transaction including operation or work items that are performed by multiple nodes, often implemented at multiple networked computer systems. Distributed transactions arise in a number of different contexts. For example, processing an employee's paycheck may involve a distributed transaction with work items performed by nodes at a number of individual computer systems. An employer payroll system node may request a transfer from its own account to the account of the employee. A node at the employer's bank may debit the employer's account by the amount of the transfer. A node at the employee's bank may credit the employee's account by the amount of the transfer. In another example, booking travel may involve a distributed transaction. A travel agent system node may request reservations on various flights, hotels, etc. In response to the requests, one or more airline system nodes may book flight tickets for a traveler. One or more hotel system nodes may create reservations for the traveler, etc.

In distributed transactions, it is often desirable to satisfy the properties of Atomicity, Consistency, Isolation and Durability, known commonly as ACID properties. A distributed transaction satisfying the Atomicity property either successfully executes to completion or fails completely. Referring to the paycheck processing example, if the employer's bank system crashes or otherwise fails to debit the employer's account, Atomicity would require that the bank system be prevented from completing the transfer to the employee's account. A transaction meeting the Consistency property does not violate integrity constraints of any shared resources. The Isolation property requires that intermediate effects of the transaction are not detectable to concurrent transactions. The Durability property requires that changes to shared resources due to the transaction are permanent.

To ensure the Atomicity property, all participants of the distributed transaction coordinate their actions so that they either unanimously abort or unanimously commit to the transaction. For example, a transaction manager may enforce Atomicity by coordinating a distributed transaction according to an atomic commit protocol. Atomic commit protocols typically have multiple phases. In a first phase, commonly known as a prepare phase, the transaction manager asks all other nodes participating in the transaction whether they will commit to the transaction. Nodes commit to the transaction by obtaining appropriate locks for transaction resources, executing a transaction operation or operations, and holding the resource locks until the transaction manager either completes or aborts the transaction. In a subsequent phase, commonly known as the commit phase, the transaction manager determines whether all nodes in the transaction have committed. If all nodes have committed, then the transaction manager completes the transaction, allowing the nodes to release their locks. If the transaction is aborted, the participating resource managers roll-back their operations and then release their locks. Accordingly, Atomicity is satisfied because all of the transaction operations are either completed, or not completed.

SUMMARY

Various examples are directed to systems and methods for coordinating a non-repudiable atomic commit transaction. A client may direct a transaction request to a transaction manager, where the transaction request comprises a transaction origin token. The transaction manager may create a transaction submission token and provide it to the client. The transaction manager may create a digest of a first work item to be executed by a first resource manager and send the digest to the first resource manager. The first resource manager may send the transaction manager a work item receipt token. The transaction manager may send the resource manager the transaction origin token.

FIGURES

Various examples are described herein in conjunction with the following figures, wherein.

DESCRIPTION

Various examples are directed to systems and methods for executing non-repudiable atomic commit transactions. Atomic commit transactions may be executed according to any suitable atomic commit protocol including, for example, two-phase or three-phase commit protocols. In various examples, a transaction manager of an atomic commit transaction may also act as a trusted third party (TPP) between the client that requested the transaction and one or more resource managers for performing work items making up the transaction. The client and the one or more resource managers may generate digitally signed tokens at various stages of an atomic commit transaction. The client and resource manager(s) may provide the tokens to the transaction manager in the course of the atomic commit transaction. The transaction manager may log the tokens and/or release the tokens to the opposite party upon confirmation that the party either has or will continue with the transaction. The client and the various resource managers may use the tokens as proof of the state of the transaction at the various stages.

Reference will now be made in detail to various examples, several of which are illustrated in the accompanying figures. Wherever practical, similar or like reference numbers may be used in the figures and may indicate similar or like functionality. The figures depict examples of the disclosed systems (or methods) for purposes of illustration only. One skilled in the art will readily recognize from the following description that alternative examples of the structures and methods illustrated herein may be employed without departing from the principles described herein.

Figure 1:
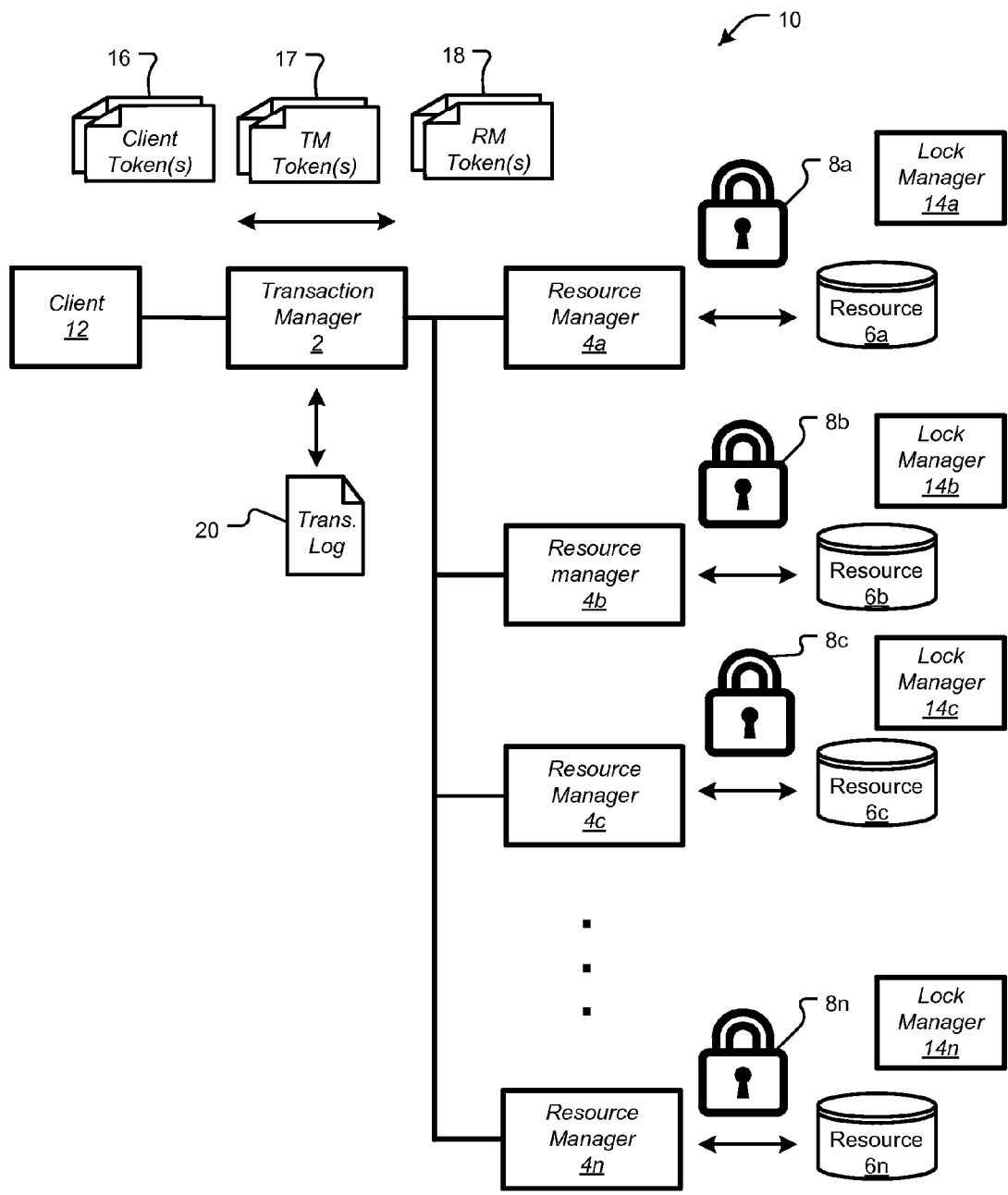
FIG. 1 is a diagram showing one example of an environment for implementing non-repudiable atomic commit transactions.

FIG. 1 is a diagram showing one example of an environment 10 for implementing non-repudiable atomic commit transactions. A client 12 may request the transaction, as described herein. The request may be directed to a transaction manager 2. The transaction manager 2 may coordinate the distributed transaction while also acting as a trusted third party (TTP) for the storing and distributing various non-repudiation tokens 16, 18. Upon receiving a request for a transaction, the transaction manager 2 may enroll one or more participating resource managers 4a, 4b, 4c, 4n. Each resource manager 4a, 4b, 4c, 4n may be enrolled to perform one or more work items that are part of transaction. For example, each resource manager 4a, 4b, 4c, 4n may have access to perform one or more work items on a corresponding transaction resource 6a, 6b, 6c, 6n. Resources 6a, 6b, 6c, 6n may be any type of resources, such as resources having a state that can be manipulated. Examples of resources may include data files, databases, database tables, messaging systems, language level resources, etc. Any suitable number of resource managers 4a, 4b, 4c, 4n and resources 6a, 6b, 6c, 6n may be used, for example, based on the nature of the distributed transaction.

Figure 2:
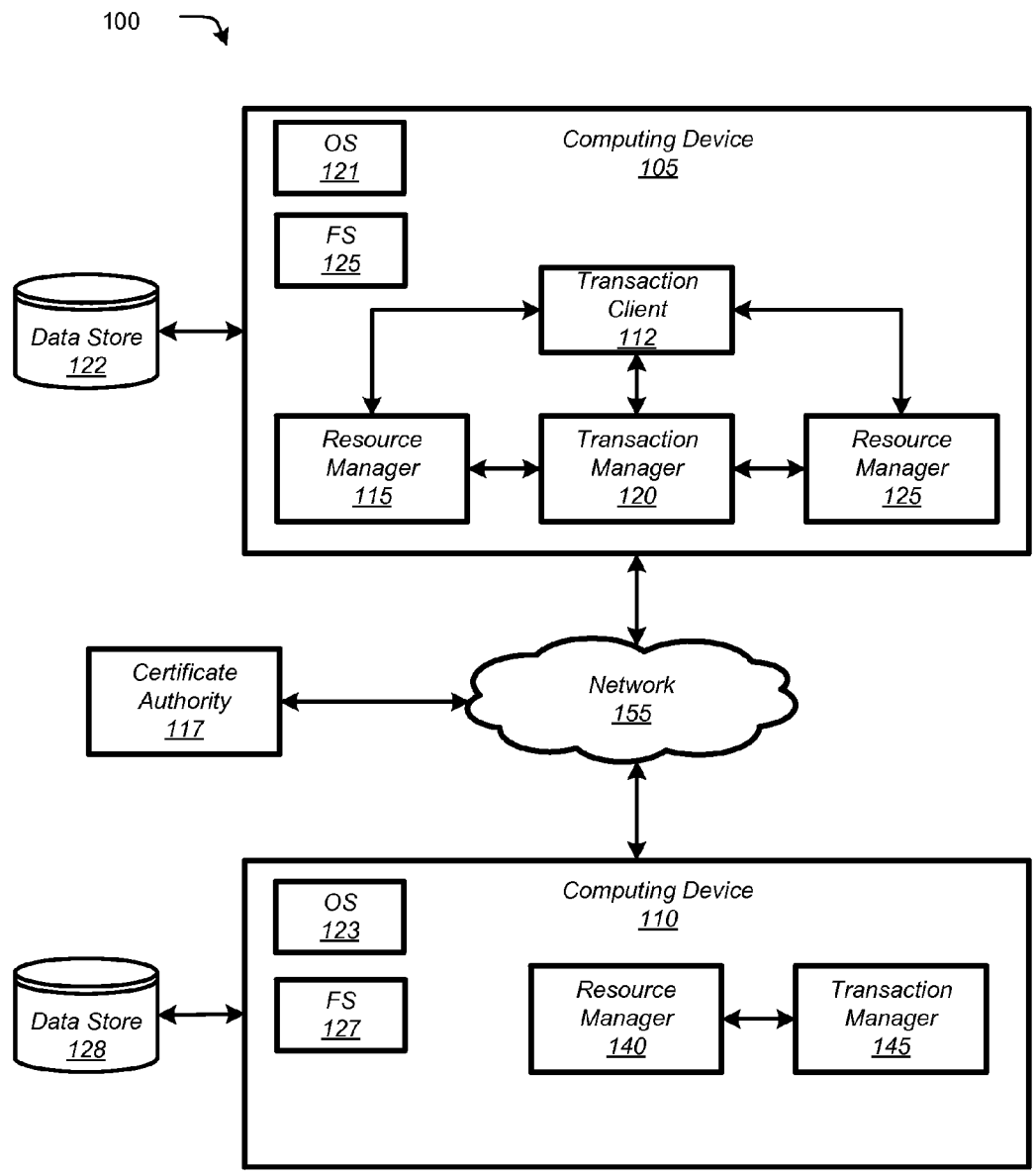
FIG. 2 shows an example of a distributed computing system that may execute various components of a non-repudiable atomic commit transaction.

After enrollment, the resource managers may enter a prepare phase. For example, the transaction manager 2 may instruct the resource managers 4a, 4b, 4c, 4n to enter the prepare phase. In the prepare phase, the resource managers 4a, 4b, 4c, 4n obtain one or more locks 8a, 8b, 8c, 8n corresponding to the resource or resources 6a, 6b, 6c, 6n that the resource manager 4a, 4b, 4c, 4n is to modify according to its assigned work item or work items. The locks 8a, 8b, 8c, 8n may be obtained from one or more lock managers 14a, 14b, 14c, 14d, 14n. The lock managers 14a, 14b, 14c, 14c, 14n may be executed at a computing device at or near a computing device where the respective resources 6a, 6b, 6c, 6n are stored. The lock managers 14a, 14b, 14c, 14n may be positioned to intercept read and write requests directed to the respective resources 6a, 6b, 6c, 6n. For example, some or all of the lock managers 14a, 14b, 14c, 14n may be part of an operating system, a file system, or other similar component executing at a computing device that is positioned to manage the respective resources 6a, 6b, 6c, 6n. In some examples, the lock managers 14a, 14b, 14c, 14n may be implemented in hardware, for example, by a suitable data storage device 122, 128 (FIG. 2). In some examples, some or all of the resources 6a, 6b, 6c, 6n may share a common lock manager.

Once the resource managers 4a, 4b, 4c, 4n obtain the respective locks 8a, 8b, 8c, 8n, they may execute their assigned work item or work items on the resources 6a, 6b, 6c, 6n. The resource managers 4a, 4b, 4c, 4n may then hold the locks 8a, 8b, 8c, 8n, so that the work items may be reversed if the transaction is rolled back. At the conclusion of the prepare phase, the transaction manager 2 may instruct the resource managers 4a, 4b, 4c, 4n to either commit or roll-back the transaction. If the transaction is committed, the resource managers 4a, 4b, 4c, 4n may release their locks 8a, 8b, 8c, 8n. If the transaction is rolled back, the resource managers 4a, 4b, 4c, 4n may reverse or undo the work items performed during the prepare phase and then release their locks 8a, 8b, 8c, 8n.

At various stages in the transaction, the client 12, the transaction manager 2, and the resource managers 4a, 4b, 4c, 4n each generate one or more digitally signed non-repudiation tokens 16, 17, 18. Tokens 16, 18 created by the resource managers 4a, 4b, 4c, 4d, 4n and/or the client 12 may be provided to the transaction manager 2. In its role as the trusted third party, the transaction manager 2 may store tokens 16, 17, 18 at a transaction log 20. Also, at various stages of the transaction, the transaction manager 2 may provide the client 12 and/or the resource managers 4a, 4b, 4c, 4n with one or more non-repudiation tokens 16, 17, 18, as described herein. For example, the resource managers 4a, 4b, 4c, 4n may be provided with non-repudiation tokens 16 generated by the client 12 and/or by the transaction manager 2. The client 12 may be provided with non-repudiation tokens 18 generated by the transaction manager 2 and/or the resource managers 4a, 4b, 4c, 4n. The parties to the transaction (e.g., the client 12 and the resources managers 4a, 4b, 4c, 4n) may use the tokens to prove the state of the transaction at the various stages. For example, the parties may use the tokens 16, 18 to demonstrate that their actions during the transaction were in response to valid messages actually sent by the other party. This may prevent parties to the transaction from falsely repudiating a message or instruction actually sent. Whether or not tokens 16, 17, 18 are provided to the parties, the transaction manager 2 may store the tokens at a transaction log 20 that may be made available to the parties if it becomes necessary to prove a state of the transaction. The transaction manager 2 may timestamp entries to the log 20. This may allow the various parties, or third parties, to cross-reference a trusted time when a token 16, 17, 18 was provided with a certificate authority 117 (FIG. 2).

The non-repudiation tokens 16, 17, 18 may be generated in any suitable manner. In some examples, the non-repudiation tokens may be created using public/private key pairs. For example, the client 12, resource managers 4a, 4b, 4c, 4n and/or transaction manager 2 may create non-repudiation tokens 16, 17, 18 by digitally signing a unit of data (e.g., an instruction or message) with the creator's private key. Other parties may verify a non-repudiation token by decrypting the token with the public key of the creator. For example, the parties 12, 4a, 4b, 4c, 4n, and/or 2 may register their public keys with a certificate or certification authority 117 (FIG. 2). Parties that want to verify a non-repudiation token may obtain the creator's private key from the certificate authority 117. For example, the client 12, the resource managers 4a, 44b, 4c, 4n and, in some examples, the transaction manager 2 may have public keys registered with a certificate authority and may generate tokens by encrypting (or signing) data with the corresponding private keys.

FIG. 2 shows an example of a distributed computing system 100 that may execute various components of a non-repudiable atomic commit transaction. For example, the distributed computing system 100 may execute the transaction manager 2, participating resource managers 4a, 4b, 4c, 4n and other components described herein. The distributed computing system 100 may comprise one or more computing devices 105, 110. The computing devices 105, 110 may comprise any suitable type of computing device or machine that has a programmable processor including, for example, one or more servers, one or more desktop computers, one or more laptop computers, one or more routers, etc. In some examples, one or both of the computing devices 105, 110 may comprise a single machine or may include multiple interconnected machines (e.g., multiple servers configured in a cluster). Although two computing devices 105, 110 are shown, any suitable number of computing devices may be utilized in the distributed transactions described herein. The computing devices 105, 110 may be implemented by a common organization or by different organizations. Referring to the paycheck processing example above, the computing device 105 may be implemented by the employer, while the computing device 110 may be implemented by the employer's bank.

Computing devices 105, 110 may execute respective operating systems (OSs) 121, 123. Any suitable operating system may be used including, for example, any suitable LINUX operating system (e.g., available from RED HAT, INC.), any suitable WINDOWS operating system available from MICROSOFT CORPORATION, any suitable UNIX operating system, any suitable OS operating system available from APPLE, INC., any suitable ANDROID operating system available from GOOGLE, any suitable iOS operating system available from APPLE INC., etc. The operating systems 121, 123 may manage execution of the various other components at the computing devices 105. In some examples, the operating systems 121, 123 may facilitate communication between the components and system hardware, such as data stores 122, 128. In some examples, computing devices 105, 110 comprise and/or are in communication with one or more data stores 122, 128. Data stores 122, 128 may be organized according to a file system 125, 127 that may be in communication with the operating system 121, 123. In some examples, data stores 122, 128 are organized according to and/or comprise any suitable database, and/or other data storage arrangement. Data stores 122, 128 may be internal to computing devices 105, 110, or external and connected to computing device 105, 110 either directly or via a network, such as the network 155. In some examples, data stores 122 may comprise transaction resources, such as 6a, 6b, 6c, 6n described above, that may be manipulated during distributed transactions. In some examples, lock managers 14a, 14b, 14c, 14n described herein may be implemented by the operating systems 121, 123, the file systems 125, 127 and/or the data stores 122, 128. In some examples, the system 100 may also comprise the certificate authority 117 in communication with the various other components via the network 155. The certificate authority 117 may store associations between parties (e.g., transaction clients, transaction managers, resource managers, etc.) and public keys associated with a public/private key pair.

The computing devices 105, 110, 117 may be in communication with one another via a network 155. The network 155 may be any suitable wired and/or wireless network and may comprise, for example, one or more local area networks (LANs), one or more wide area networks (WANs), one or more public networks such as the Internet, etc. The network 155 may carry communications between components 115, 125, 140, 120, 145 (e.g., components not executing on the same computing device). In some examples, distributed transactions may be executed without using the network 155. For example, the distributed computing system 100 may be implemented on a single computing device 105 or 110. Also, for example, the computing devices 105, 110 may be directly connected to one another.

In the example of FIG. 2, the computing device 105 comprises resource managers 115, 125, a first transaction manager 120, and a transaction client 112. The computing device 110 comprises a resource manager 140 and a transaction manager 145. The resource managers 115, 125, 140 may be or comprise any suitable component of the distributed computing system 100 that is configured to manage resources (e.g., resources stored at the data stores 122, 128). Resource managers 115, 125, 140 may be executed by one or both of the computing devices 105, 110 to manage one or more system resources such as, for example, persistent and stable storage systems such as the data stores 122, 128. The resource managers 115, 125, 140 may comprise any manager configured to manage a storage system including, for example, a file manager, a database, a messaging service, etc. Examples of resource managers include relational databases, an executive information system (EIS), a Java Message Service (JMS) provider configured to manage transactional message delivery, etc.

The transaction managers 120, 145 may be executed at one or both of the computing devices 105, 110 and are programmed to coordinate distributed transactions by coordinating multiple participating resource managers. The participating resource managers may include, other transaction managers 120, 145, or local resource managers 115, 125, 140. In some examples, transaction managers 120 145 may take part in distributed transactions as a participating resource manager when a distributed transaction can be broken into constituent distributed transactions. The transaction manager 120 may be configured as a master transaction manager and may instruct one or more of the resource managers 115, 125, 140 to perform one or more operations on resources to implement the transaction. Additionally, the transaction manager 120 may instruct the transaction manager 145 to coordinate a second distributed transaction that is a constituent of the first distributed transaction. Accordingly, the transaction manager 145 may instruct one or more of the resource managers 115, 125, 140 regarding operations according to the second distributed transaction.

The transaction client 112 may be an application that requests a distributed transaction (e.g., a non-repudiable atomic commit transaction). For example, a referring to the paycheck processing example, a transaction client may be an application at a computing device of the employer that requests the paycheck processing transaction. Referring to the travel booking example, a transaction client may be an application associated with a travel agent, an Internet-provided application with which a user can initiate a reservation request, etc. A transaction manager such as 120, 145 may establish a new transaction upon receiving a request from a transaction client 112 to perform the transaction. The transaction client 112 may be co-located with the first transaction manager 120 (as shown), or may be located on a remote machine (e.g., on computing device 110).

Figure 3:
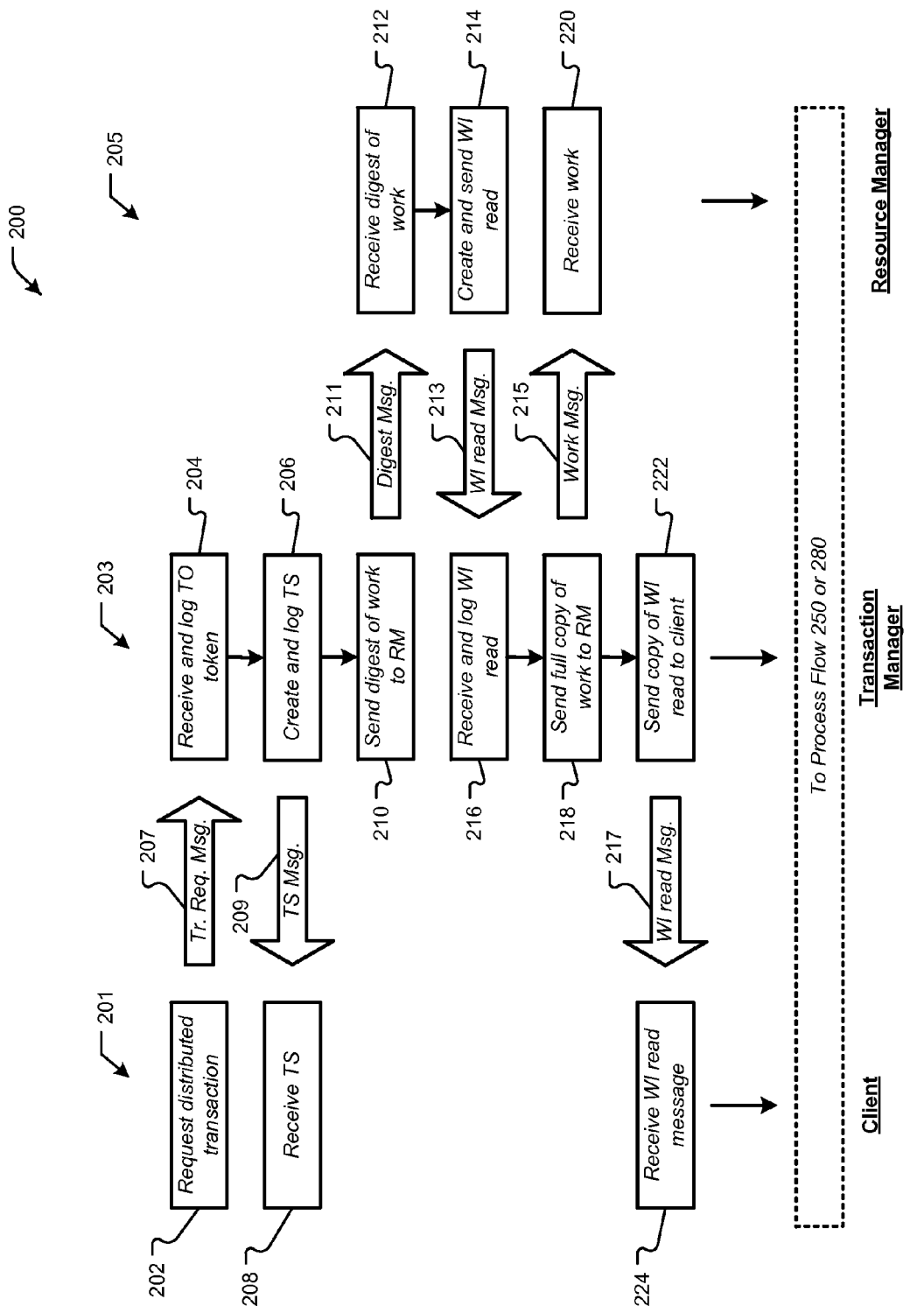
FIG. 3 is a flow chart showing one example of a process flow for executing a non-repudiable atomic commit transaction.

FIG. 3 is a flow chart showing one example of a process flow 200 for executing a non-repudiable atomic commit transaction. The flow chart of FIG. 3 comprises three columns, where each column includes actions that may be performed by a different actor in the transaction. A column 201 includes actions that may be performed by the client 12 (FIG. 1). A column 203 includes actions that may be performed by the transaction manager 2. A column 205 includes actions that may be performed by a resource manager 4a. Although the process flow 200 shows actions for only one resource manager 4a, any suitable number of resource managers 4 may take part in the transaction. Interactions between the client 12, the transaction manager 2 and additional resource managers (e.g., 4b, 4c, 4n) may be similar to the interactions described with respect to the resource manager 4a.

At 202, the client 12 may request a distributed transaction. The client 12 may send a transaction request message 207 to the transaction manager 2. The transaction request message 207 may comprise various data including, for example, a description of the requested transaction and a non-repudiation token. For example, the client 12 may generate a non-repudiation of origin or transaction origin token to be included in the request 207. The client 12, or an associated party, may create the transaction origin token, for example, by digitally signing transaction origin data with the private key of the client 12. Transaction origin data may include, for example, any suitable description of the transaction. The description may comprise a letter, number, or alphanumeric identifier of the transaction and/or any description of the transaction. In some examples, the transaction origin data may also include a random number (e.g., a true random number or pseudorandom number). The client 12, for example, may generate the random number in any suitable manner. In addition to being included in the transaction origin data, the random number may provided to the transaction manager 2 as part of the transaction request message 207 and used later in the transaction, as described herein. In some examples, the random number may be known only to the client 12, which may generate the random number, and to the transaction manager 2, which receives the random number with the transaction origin data in the transaction request message 207. One example of transaction origin data is provided by TABLE 1 below:

| Transaction Origin Data | |
|---|---|
| Transaction ID | 2A3HF |
| Transaction Description | Employee X - Process Paycheck |
| Random Number | 19760586543227 |

The client 12 may digitally sign the transaction origin data (e.g., with the client's private key) to generate the transaction origin token. In some examples, the transaction request message 207 is the transaction origin token. The transaction manager 2 may decrypt the transaction origin token with the client's public key, revealing the transaction origin data.

The transaction manager 2 may, at 204, receive and log the transaction origin token. For example, the transaction manager 2 may write a copy of the transaction origin token to the transaction log 20. In some examples, the transaction manager 2 may create a timestamp for the transaction origin token at the transaction log 20. The timestamp may indicate a time that the transaction origin token was transmitted by the client 12, or an approximation of that time. For example, the timestamp may indicate the time that the transaction origin token was received by the client 2 (e.g., with the request 207), a time that the transaction origin token was logged to the transaction log 20, etc. In some examples, the transaction manager 2 may also log other information included with request 207 such as, for example, the random number.

At 206, the transaction manager 2 may create a non-repudiation of submission or transaction submission token. The transaction manager 2 may create the transaction submission token, for example, by encrypting a description of the transaction with the private key of the transaction manager 2. In some examples, the description of the transaction may be the same description that the client 12 encrypted to create the transaction origin token. The transaction submission token may be written to the log 20 (e.g., with a timestamp) and sent to the client 12 in a transaction submission message 209. The client 12 may receive the transaction submission message 209 and transaction submission token at 208. To the client 12, the transaction submission token may serve as proof that the client 12 sent the request 207 and that the request 207 was received by the transaction manager 2.

210, 212, 214, 216, 218 and 220 describe interactions between the transaction manager 2 and the example resource manager 4a. In examples where the transaction includes additional resource managers 4b, 4c, 4n, the actions 210, 212, 214, 216, 218 may be performed with respect to one or more of the additional resource managers 4b, 4c, 4n as well. At 210, the transaction manager 2 may send a digest message 211 comprising a digest of a work item to the resource manager 4a. The work item may be a component of the distributed transaction to be executed by the resource manager 4a. For example, the work item may comprise a series of actions that the resource manager 4a may perform. The digest of the work item may be created from a description of the work item. The digest may be identifiable with the work item, but may not be decipherable to the resource manager 4a. For example, the transaction manager 2 may create the digest 211 by taking a cryptographic hash of the description of the work item. In this way, a party in possession of the work item description (e.g., the transaction manager 2 or a party having access to the log 20) may verify that the digest refers to the work item by re-hashing the work item and comparing the results to the digest. In some examples, the transaction manager 2 may digitally sign the digest 211 with its private key.

The resource manager 4a may receive the digest at 212. In response, the resource manager 4a may, at 214, generate a non-repudiation of receipt or work item receipt token and send to the transaction manager 2 a message 213 comprising the work item receipt token. The resource manager 4a may create the work item receipt token, for example, by digitally signing the digest 211 with its (the resource manager's) private key. The transaction manager 2 may receive and log the work item receipt token at 216, for example, with a timestamp indicating the time of creation and/or receipt of the work item receipt token. Upon receiving and logging the work item receipt token, the transaction manager 2 may send to the resource manager 4a a work message 214 comprising the description of the work item in a format decipherable to the resource manager 4a. For example, the description of the work item may be in the clear or the resource manager 4a may comprise an appropriate cryptographic key or keys to decrypt the message.

Optionally, the work message 214 may also comprise a copy of the transaction origin token generated by the client 12. In this way, the resource manager 4a may be provided with proof that the transaction associated with the work item was requested by the client 12. If a dispute arises as to the authenticity of the transaction origin token, the transaction log 12 and/or the certificate authority 117 may be consulted. For example, if the transaction origin token is time stamped at the log 20 during a time when the certificate authority 117 had a valid association between the client 12 and the public key that can decrypt the transaction origin token, then the client 12 may be prevented from repudiating the transaction request 207. Also optionally, at 222, the transaction manger 2 may send to the client 12 a work item receipt message comprising a copy of the work item receipt token generated by the resource manager 4a. The client 12 may receive the work item receipt token message at 224. The work item receipt token, in conjunction with the timestamp generated by the transaction manager 2 at the transaction log 20, may serve as proof that the resource manager 4a received the work item, thus preventing the resource manager 4a from later claiming otherwise. Because the transaction manager 2 acts as a trusted third party, the resource manager 4a may be willing to generate the work item receipt token confirming receipt of the work item (at 214) before it actually receives the work item (at 220).

Figure 4:
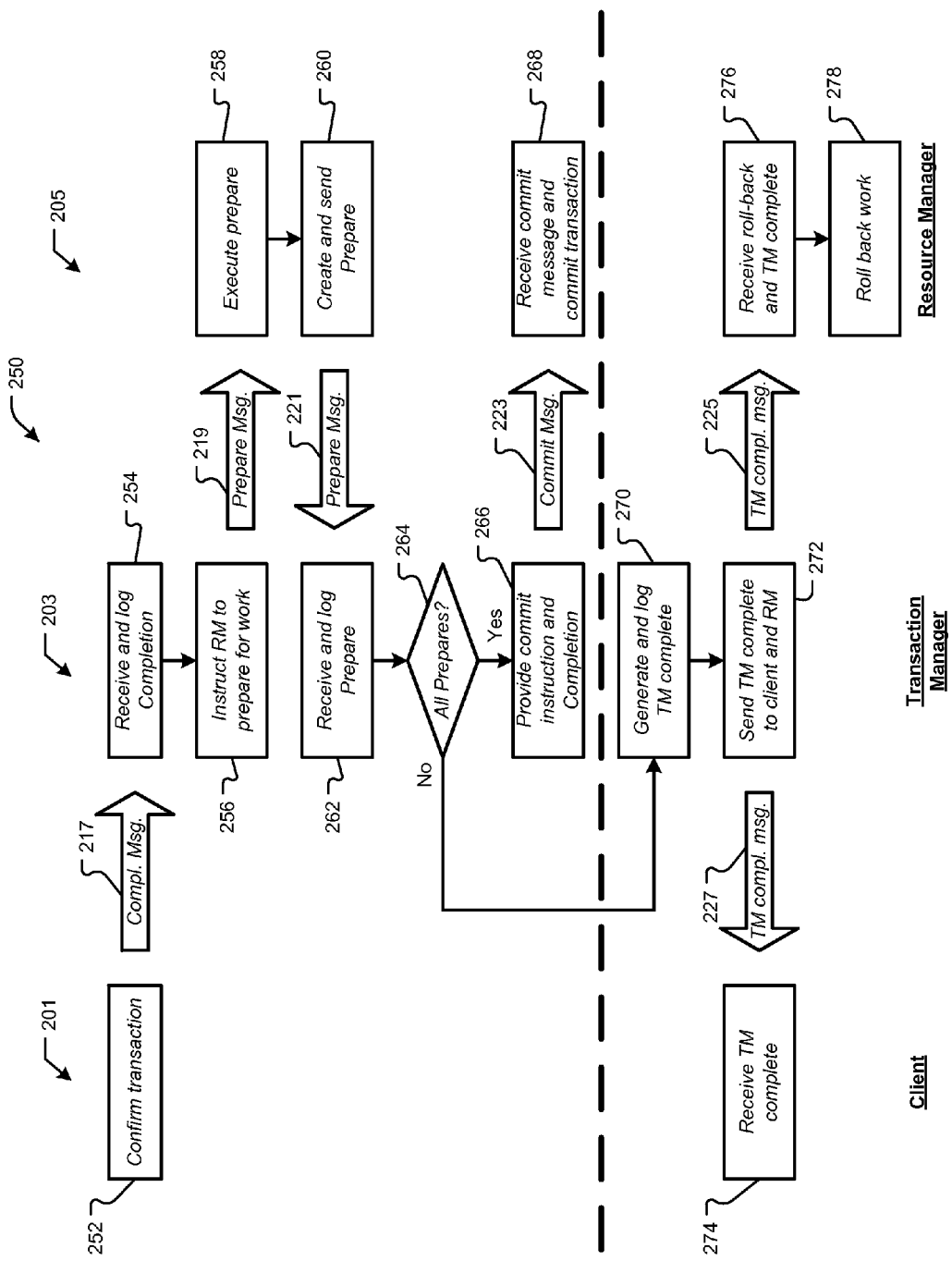
FIG. 4 is a flow chart showing one example of a process flow showing additional actions that may be performed by the client, transaction manager, and resource manager to execute a non-repudiable atomic commit transaction.

After 222 and 224, the client 12, transaction manager 2, and resource manager 4a may proceed to the actions set forth in the process flow 250 (e.g., if the client 12 confirms the transaction) or the process flow 280 (e.g., if the client rolls-back the transaction). FIG. 4 is a flow chart showing one example of the process flow 250, which shows additional actions that may be performed by the client 12, transaction manager 2, resource manager 4a to proceed with a non-repudiable atomic commit transaction. The flow chart of FIG. 4 also comprises three columns 201, 203, 205. Similar to FIG. 3, column 201 includes actions that may be performed by the client 12; column 203 includes actions that may be performed by the transaction manager 2; and column 205 includes actions that may be performed by a resource manager 4a. Again, although the process flow 250 shows actions for only one resource manager 4a, any suitable number of resource managers 4a, 4b, 4c, 4n may take part in the transaction. Interactions between the client 12, the transaction manager 2 and additional resource managers (e.g., 4b, 4c, 4n) may be similar to the interactions described with respect to the resource manager 4a.

At 252, the client 12 may confirm whether to proceed with the transaction. For example, the transaction manager 2, after enrolling one or more resource managers 4a, 4b, 4c, 4n as described, may not proceed with the transaction until the client 12 confirms. Confirming the transaction may comprise creating a non-repudiation of completion or completion token. The completion token may be created, for example, by digitally signing with the client's private key an indication of that the client 12 confirms the transaction. The completion token may be included in a completion token message 217 directed to the transaction manager 2. The transaction manager 2 may, at 254, receive the completion token message 217 and log the message (e.g., with a timestamp) at the transaction log 20. In some examples, the transaction manager 2 may generate non-repudiation of confirmation receipt or confirmation receipt token and transmit it back to the client 12. This may allow the client 12 to prove that the transaction manager 2 received the completion token.

256, 258, 260, 262, 264, 266, 268, 270 and 272 describe interactions between the transaction manager 2 and the example resource manager 4a. In examples where the transaction includes additional resource managers 4b, 4c, 4n, the actions 256, 258, 260, 262, 264, 266, 268, 270 and 272 may be performed with respect to the one or more of the additional resource managers 4b, 4c, 4n as well. At 256, the transaction manager 2 may send the resource manager 4a a prepare instruction 219. The prepare instruction may instruct the resource manager 4a to execute a prepare phase of the transaction at 258. In response, the resource manager 4a may obtain one or more locks 8a on one or more resources 6a, and may execute the work item on the one or more resources 6a. The resource manager 4a may hold the locks 8a until the commit phase, as described herein. Before, during, or after executing the prepare phase, the resource manager 4a may create and send a non-repudiation of validation or prepare token. The prepare token may be created by digitally signing data describing the prepare instruction with the private key of the resource manager 4a. The prepare token may be sent to the transaction manager 2 in a prepare message 221. In some examples, the transaction manager 2 may respond to the prepare message 221 by sending the resource manager 4a the random number received from the client and described above. For example, the resource manager 4a may use the random number as proof that the transaction manager 2 accepted the prepare token. The transaction manager 2 may receive and log the prepare token (e.g., with a timestamp) at 262. Optionally, the transaction manager 2 may provide the prepare token to the client 12 as proof that the resource manager 4a was prepared to commit to the transaction.

At 264, the transaction manager 2 may determine whether all resource managers 4a, 4b, 4c, 4n taking part in the transaction have returned prepare tokens or otherwise indicated an ability to commit to the transaction. If yes, the transaction manager 2 may, at 266, send a commit message 223 to the resource manager 4a. The commit message 223 may comprise an instruction to commit and, in some examples, may include the completion token generated by the client 12 at 252. The resource manager 4a may receive the commit message 223 and commit the transaction at 268. Committing the transaction may comprise releasing the lock or locks 8a held by the resource manager 4a. This may allow other actors to access the resources 6a.

Referring back to 264, if one or more of the resource managers 4a, 4b, 4c, 4n does not send back a prepare token or otherwise indicates an inability to commit to the transaction, then the transaction may not be able to proceed according to the atomic commit protocol and may be rolled-back. Accordingly, the transaction manager 2 may, at 270, generate and log (e.g., with timestamp), a transaction manager non-repudiation of commit token or TM roll-back token. The transaction manager 2 may create the TM roll-back token by digitally signing an instruction to roll-back the transaction with the transaction manager's private key. At 272, the transaction manager 2 may send the TM roll-back token to the resource manager 4a in a TM roll-back message 225. Upon receiving the TM roll-back message 225 at 276, the resource manager 4a may roll-back the work item at 278. Rolling back the work item may comprise un-doing the modifications to the resource 6a made during the prepare phase and releasing the locks 8a. The TN completion messages 225 may provide the resource manager 4a with proof that it was asked to roll-back the transaction from the transaction manager 2. Optionally, the transaction manager 2 may also provide a TM roll-back message 227 including the TM roll-back token to the client 12, which may receive the same at 274.

Figure 5:
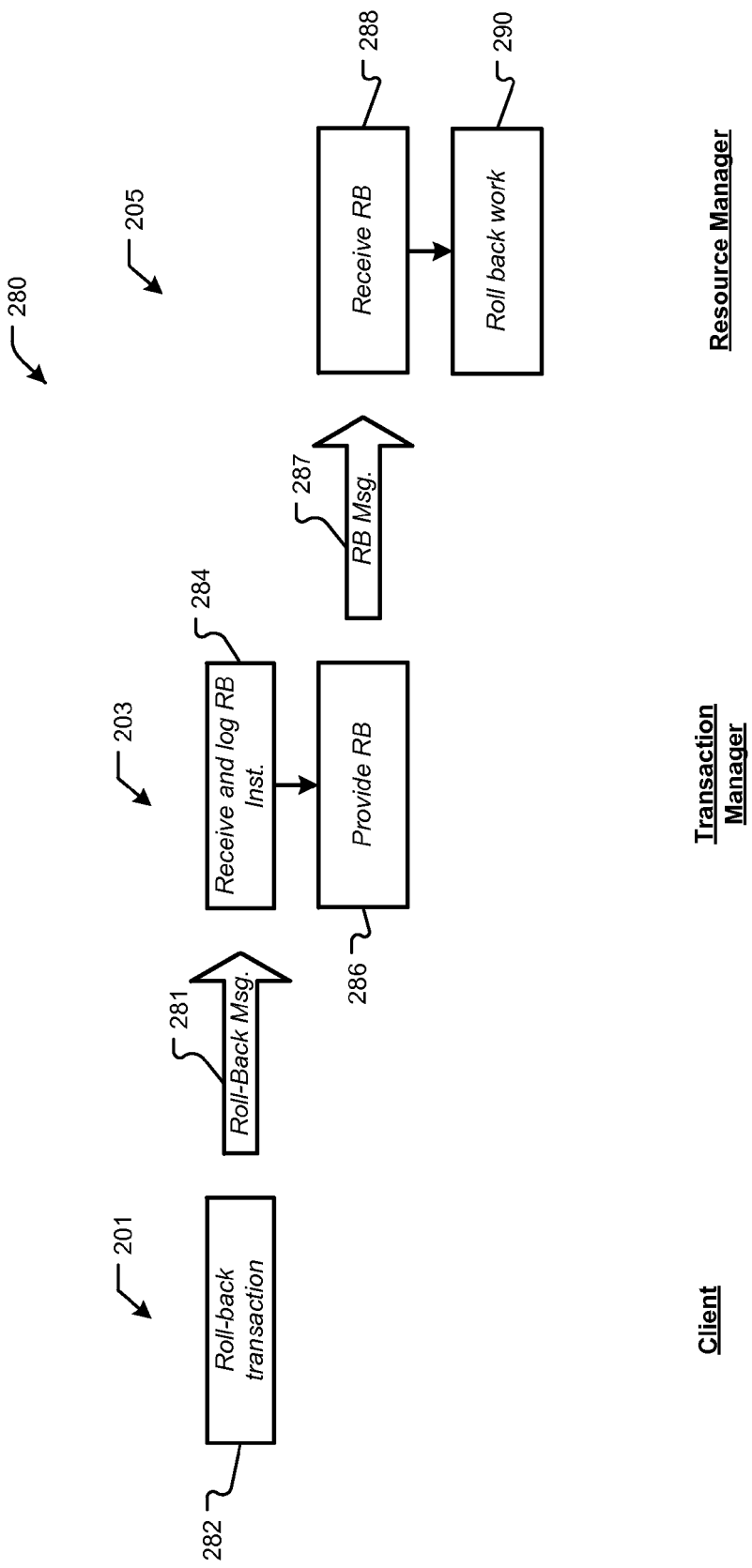
FIG. 5 is a flow chart showing one example of a process flow for rolling back a non-repudiable atomic commit transaction on the instructions of the client.

In some examples, the client 12 may choose to roll-back the transaction, for example, after execution of the process flow 200. FIG. 5 is a flow chart showing one example of a process flow 280 for rolling back a non-repudiable atomic commit transaction on the instructions of the client 12. The flow chart of FIG. 5 also comprises three columns 201, 203, 205. Similar to FIGS. 3 and 4, column 201 includes actions that may be performed by the client 12; column 203 includes actions that may be performed by the transaction manager 2; and column 205 includes actions that may be performed by a resource manager 4a. Again, although the process flow 280 shows actions for only one resource manager 4a, any suitable number of resource managers 4a, 4b, 4c, 4n may take part in the transaction. Interactions between the client 12, the transaction manager 2 and additional resource managers (e.g., 4b, 4c, 4n) may be similar to the interactions described with respect to the resource manager 4a.

The client 12 may request a roll-back of the transaction at 282. For example, the client 12 may generate a non-repudiation of completion or roll-back token by digitally signing, with its private key, an instruction to roll-back the transaction. The roll-back token generated at 282 may be distinct from the completion token described above with respect to 252. For example, the completion token generated at 252 may be a digitally signed indication of a confirmation instruction, while the roll-back token generated at 282 may be a digitally signed indication of a roll-back instruction. The client 12 may send a roll-back message 217 including the roll-back token to the transaction manager 2, which may receive the message and log the roll-back token (e.g., with timestamp) at 284. At 286, the transaction manager 2 may provide the roll-back token to the resource manager 4a in a roll-back message 287. The resource manager 4a may receive the roll-back message 287 at 288. The roll-back token may provide the resource manager 4a with proof that the transaction was rolled back by the client 12. At 290, the resource manager 4a may roll-back the work indicated during execution of the process flow 200 described above. Optionally, the transaction manager 2 may query the resource manager 4a for a confirm roll-back token that may be used to prove that the resource manager 4a received and acted on the roll-back message 287.

The process flows 200, 250 and 280 are described with respect to the client 12, the transaction manger 2 and a single resource manager 4a. In various examples, as described, additional resource managers 4a, 4b, 4c, 4n may take part in the transaction. In some examples, one or more resource managers 4a, 4b, 4c, 4n may take part in the transaction, but not in a non-repudiable manner (e.g., non-verified resource managers). For example, non-verified resource managers may not be asked to generate non-repudiation tokens 18 (FIG. 1) and may not be provided with non-repudiation tokens 16, 17. Instead, non-verified resource mangers may receive instructions from the transaction manager 2 according to a standard atomic commit protocol. For example, referring to FIG. 3, instead of sending a digest of an assigned work item and requesting a work item receipt token, the transaction manager 2 may send non-verified resource managers the full description of the work item. Also, referring to FIG. 4, the transaction managers may not receive prepare tokens from non-verified resource managers but may instead receive a message indicating that the non-verified resource manager has nor has not successfully completed the prepare phase (e.g., executed the work item while maintaining locks). Similarly, the transaction manager may send a non-verified resource manager an instruction to commit or roll back without an accompanying token. Non-verified resource managers may be used for any suitable purpose. For example, if a resource manager 4a, 4b, 4c, 4n is implemented by the same enterprise as the client 12, then there may not be as acute a need for one party to prove its state relative to the other.

Reference in the specification to, "examples," "various examples," "some examples," etc. means that a particular feature, structure, or characteristic described in connection with the example embodiments is included in at least one embodiment of the invention. The appearances of the above-referenced phrases in various places in the specification are not necessarily all referring to the same embodiment. Reference to embodiments is intended to disclose examples, rather than limit the claimed invention. While the invention has been particularly shown and described with reference to several embodiments, it will be understood by persons skilled in the relevant art that various changes in form and details can be made therein without departing from the spirit and scope of the invention.

It should be noted that the language used in the specification has been principally selected for readability and instructional purposes, and may not have been selected to delineate or circumscribe the inventive subject matter. Accordingly, the present disclosure is intended to be illustrative, but not limiting, of the scope of the invention.

It is to be understood that the figures and descriptions of example embodiments of the present disclosure have been simplified to illustrate elements that are relevant for a clear understanding of the present disclosure, while eliminating, for purposes of clarity, other elements, such as for example, details of system architecture. Those of ordinary skill in the art will recognize that these and other elements may be desirable for practice of various aspects of the present examples. However, because such elements are well known in the art, and because they do not facilitate a better understanding of the present disclosure, a discussion of such elements is not provided herein.

It is to be understood that the figures and descriptions of example embodiments of the present disclosure have been simplified to illustrate elements that are relevant for a clear understanding of the present disclosure, while eliminating, for purposes of clarity, other elements, such as for example, details of system architecture. Those of ordinary skill in the art will recognize that these and other elements may be desirable for practice of various aspects of the present examples. However, because such elements are well known in the art, and because they do not facilitate a better understanding of the present disclosure, a discussion of such elements is not provided herein.

In some examples of the present methods and systems disclosed herein, a single component can be replaced by multiple components, and multiple components replaced by a single component, to perform a given command or commands. Except where such substitution would not be operative to practice the present methods and systems, such substitution is within the scope of the present disclosure. Examples presented herein, including operational examples, are intended to illustrate potential implementations of the present method and system examples. Such examples are intended primarily for purposes of illustration. No particular aspect or aspects of the example method, product, computer-readable media, and/or system examples described herein are intended to limit the scope of the present disclosure.

The various components of the environment 10 and the distributed computing system 100 may be and/or are executed by any suitable type of computing device including, for example, desktop computers, laptop computers, mobile phones, palmtop computers, personal data assistants (PDAs), etc. As used herein, a "computer," "computer system," "computer device," or "computing device," "machine," may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for processing data for standalone application and/or over a networked medium or media. Computers and computer systems disclosed herein may include operatively associated memory for storing certain software applications used in obtaining, processing, storing, and/or communicating data. Such memory can be internal, external, remote, or local with respect to its operatively associated computer or computer system. Memory may also include any means for storing software or other instructions including, for example and without limitation, a hard disk, an optical disk, floppy disk, ROM (read-only memory), RAM (random-access memory), PROM (programmable ROM), EEPROM (extended erasable PROM), and/or other like computer-readable media.

Some portions of the above disclosure are presented in terms of methods and symbolic representations of operations on data bits within a computer memory. These descriptions and representations are the means used by those skilled in the art to most effectively convey the substance of their work to others skilled in the art. A method is here, and generally, conceived to be a sequence of actions (instructions) leading to a desired result. The actions are those requiring physical manipulations of physical quantities. Usually, though not necessarily, these quantities take the form of electrical, magnetic, or optical signals capable of being stored, transferred, combined, compared, and otherwise manipulated. It is convenient at times, principally for reasons of common usage, to refer to these signals as bits, values, elements, symbols, characters, terms, numbers, or the like. Furthermore, it is also convenient at times, to refer to certain arrangements of actions requiring physical manipulations of physical quantities as modules or code devices, without loss of generality. It should be borne in mind, however, that all of these and similar terms are to be associated with the appropriate physical quantities and are merely convenient labels applied to these quantities. Unless specifically stated otherwise as apparent from the preceding discussion, throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission, or display devices.

Certain aspects of the present disclosure include process steps and instructions described herein in the form of a method. It should be noted that the process steps and instructions of the present disclosure can be embodied in software, firmware, or hardware, and when embodied in software, can be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, magnetic-optical disks, read-only memories (ROMs), random-access memories (RAMs), electrically-programmable read-only memories (EPROMs), electrically erasable programmable read-only memories (EEPROMs), magnetic or optical cards, application-specific integrated circuits (ASICs), or any type of media suitable for storing electronic instructions, and each coupled to a computer system bus. Furthermore, the computers and computer systems referred to in the specification may include a single processor or may be architectures employing multiple processor designs for increased computing capability.

The methods and systems presented herein, unless indicated otherwise, are not inherently related to any particular computer or other apparatus. Various general-purpose systems may also be used with programs in accordance with the teachings herein, or it may prove convenient to construct more specialized apparatus to perform the disclosed method actions. The structure for a variety of these systems will appear from the above description. In addition, although some of the examples herein are presented in the context of a particular programming language, the present disclosure is not limited to any particular programming language. A variety of programming languages may be used to implement the teachings of the present disclosure as described herein, and any references above to specific languages are provided for disclosure of enablement and best mode of the present disclosure.

The term "computer-readable medium" as used herein may include, for example, magnetic and optical memory devices such as diskettes, compact discs of both read-only and writeable varieties, optical disk drives, and hard disk drives. A computer-readable medium may also include non-transitory memory storage that can be physical or virtual.

We claim:

1. A computer-implemented system for coordinating a transaction, the system comprising:
  at least one processor and operatively associated memory, wherein the at least one processor is programmed to execute a transaction manager for coordinating an atomic commit transaction, wherein the transaction manager is programmed to:
    receive from a client a transaction request, wherein the transaction request comprises a description of the transaction and a transaction origin token digitally signed with a private key of the client;
    create a transaction submission token digitally signed with a private key of the transaction manager;
    send the transaction submission token to the client;
    generate a digest of a work item from the transaction;
    send the digest of the work item to a resource manager for performing the work item;
    receive from the resource manager a work item receipt token digitally signed with a private key of the resource manager;
    send the work item and the transaction origin token to the resource manager;
    receive from the client a commit instruction and a completion token digitally signed with the private key of the client;
    send the resource manager a prepare instruction;
    receive from the resource manager a prepare token digitally signed with the private key of the resource manager;
    determine that all resource managers taking part in the transaction have returned prepare tokens; and
    send the commit token to the resource manager.

2. The system of claim 1, wherein the transaction manager is further programmed to:
  write the transaction origin token and the transaction submission token to a transaction log;
  write the work item receipt token to the transaction log; and
  write the prepare token to the transaction log.

3. The system of claim 1, wherein the transaction manager is further programmed to:
  generate a second digest for a second work item from the transaction;
  send the second digest of the second work item to a second resource manager for performing the second work item;
  receive from the second resource manager a second work item receipt token digitally signed with a private key of the second resource manager;
  send the second work item and the transaction origin token to the second resource manager;
  after receiving the commit instruction from the client, send the second resource manager a second prepare instruction;
  receive from the second resource manager a second prepare token digitally signed with the private key of the second resource manager; and
  after determining that all resource managers taking part in the transaction have returned prepare tokens, send the commit token to the second resource manager.

4. The system of claim 1, wherein the description of the transaction or the transaction origin token comprise a random number generated by the client, and wherein the transaction manager is further programmed to send the random number to the resource manager in response to the prepare token.

5. The system of claim 1, wherein the transaction manager is further programmed to:
send a description of a second work item to a non-verified resource manager for performing the second work item;
receive from the non-verified resource manager an indication that the non-verified resource manager has successfully executed the second work item; and
send a commit instruction to the non-verified resource manager.

6. A computer-implemented system for coordinating a transaction, the system comprising:
at least one processor and operatively associated memory, wherein the at least one processor is programmed to execute a transaction manager for coordinating an atomic commit transaction, wherein the transaction manager is programmed to:
receive from a client a transaction request, wherein the transaction request comprises a description of the transaction and a transaction origin token;
create a transaction submission token;
send the transaction submission token to the client;
generate a digest of a work item from the transaction;
send the digest of the work item to a resource manager for performing the work item;
receive from the resource manager a work item receipt token digitally signed; and
send the work item and the transaction origin token to the resource manager.

7. The system of claim 6, wherein the transaction manager is further programmed to:
receive from the client a commit instruction and a commit token;
send the resource manager a prepare instruction;
receive from the resource manager a prepare token;
determine that all of a plurality of resource managers taking part in the transaction have successfully completed assigned work items; and
send the commit token to the resource manager.

8. The system of claim 7, wherein the transaction manager is further programmed to:
generate a second digest for a second work item from the transaction;
send the second digest of the second work item to a second resource manager for performing the second work item;
receive from the second resource manager a second work item receipt token;
send the second work item and the transaction origin token to the second resource manager;
after receiving a commit instruction from the client, send the second resource manager a second prepare instruction;
receive from the second resource manager a second prepare token digitally signed with the private key of the second resource manager; and
after determining that all resource managers taking part in the transaction have successfully completed assigned work items, send the commit token to the second resource manager.

9. The system of claim 6, wherein the plurality of resource managers comprises a non-verified resource manager, and wherein the transaction manager is further programmed to:
send a description of a second work item to the non-verified resource manager;
receive from the non-verified resource manager an indication that the non-verified resource manager has successfully executed the second work item; and
send a commit instruction to the non-verified resource manager.

10. The system of claim 6, wherein sending the resource manager the prepare instructions comprises instructing the resource manager to execute the work item and subsequently hold at least one lock for a resource subject to the work item.

11. The system of claim 6, wherein the transaction manager is further programmed to:
receive from the client a commit instruction and a commit token;
send the resource manager a prepare instruction;
receive from the resource manager a prepare token;
determine at least one resource manager taking part in the transaction has indicated unsuccessful preparation for the transaction; and
send to the resource manager a transaction manager roll-back token.

12. The system of claim 11, wherein sending the resource manager the prepare instructions comprises instructing the resource manager to execute the work item and subsequently hold at least one lock for a resource subject to the work item, and wherein sending the resource manager a transaction token comprises instructing the resource manager to reverse the work item.

13. The system of claim 6, wherein the transaction manager is further programmed to:
receive from the client a rollback token;
request a confirm roll-back token from the resource manager;
receive a confirm roll-back token from the resource manager.

14. The system of claim 13, wherein the transaction manager is further programmed to instruct the resource manager to not to execute the work item.

15. The system of claim 6, wherein the description of the transaction or the transaction origin token comprise a random number generated by the client, and wherein the transaction manager is further programmed to send the random number to the resource manager in response to the prepare token.

16. The system of claim 6, wherein the transaction origin token comprises a description of the transaction that is digitally signed with a private key associated with the client.

17. The system of claim 6, wherein the transaction manager is further programmed to record the transaction origin token to a transaction log with a timestamp indicating about when the transaction origin token was transmitted by to the transaction manager by the client.

18. A computer-implemented method for coordinating by a transaction manager executed by at least one processor, the method comprising:
receiving, by the transaction manager and from a client, a transaction request, wherein the transaction request comprises a description of the transaction and a transaction origin token;
creating, by the transaction manager, a transaction submission token;
sending, by the transaction manager, the transaction submission token to the client;
generating, by the transaction manger, a digest of a work item from the transaction;
sending, by the transaction manager, the digest of the work item to a resource manager for performing the work item;

receiving, by the transaction manager and from the resource manager, a work item receipt token digitally signed; and sending, by the transaction manager the work item and the transaction origin token to the resource manager.

19. The method of claim 18, further comprising:

receiving, by the transaction manager and from the client, a commit instruction and a commit token;

sending, by the transaction manager and to the resource manager, a prepare instruction;

receiving, by the transaction manager and from the resource manager, a prepare token;

determining, by the transaction manager, that all of a plurality of resource managers taking part in the transaction have successfully completed assigned work items; and sending, by the transaction manager and to the resource manager, the commit token.

20. The method of claim 19, further comprising:

generating, by the transaction manager, a second digest for a second work item from the transaction;

sending, by the transaction manager, the second digest of the second work item to a second resource manager for performing the second work item;

receiving, by the transaction manager and from the second resource manager, a second work item receipt token;

sending, by the transaction manager, the second work item and the transaction origin token to the second resource manager;

after receiving a commit instruction from the client, sending, by the transaction manager and to the second resource manager, a second prepare instruction;

receiving, by the transaction manager, from the second resource manager a second prepare token digitally signed with the private key of the second resource manager; and after determining that all resource managers taking part in the transaction have successfully completed assigned work items, sending, by the transaction manager, the commit token to the second resource manager.

* * * * *